(12) United States Patent
Salsbury

(10) Patent No.: US 12,360,245 B2
(45) Date of Patent: Jul. 15, 2025

(54) DYNAMIC SENSING CHANNEL MULTIPLEXING FOR LIDAR APPLICATIONS

(71) Applicant: Waymo LLC, Mountain View, CA (US)

(72) Inventor: Chase Salsbury, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 874 days.

(21) Appl. No.: 17/247,181

(22) Filed: Dec. 2, 2020

(65) Prior Publication Data

US 2022/0171059 A1 Jun. 2, 2022

(51) Int. Cl.
*G01S 17/58* (2006.01)
*G01S 7/481* (2006.01)
*G01S 7/484* (2006.01)
*G01S 17/931* (2020.01)

(52) U.S. Cl.
CPC ............ *G01S 17/58* (2013.01); *G01S 7/4816* (2013.01); *G01S 7/484* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,283,795 A * | 2/1994 | Fink | H01S 3/08009 372/28 |
| 5,574,537 A | 11/1996 | Ozawa | |
| 8,112,223 B2 | 2/2012 | Jordan et al. | |
| 8,687,173 B2 | 4/2014 | Rezk et al. | |
| 9,851,470 B2 | 12/2017 | Henderson et al. | |
| 10,436,906 B2 | 10/2019 | Droz | |
| 11,592,560 B2 | 2/2023 | Schmalenberg et al. | |

(Continued)

FOREIGN PATENT DOCUMENTS

CN 111999739 A 11/2020

OTHER PUBLICATIONS

Marino, A.M. et al., "Phase-Locked Laser System for Use in Atomic Coherence Experiments", Review of Scientific Instruments 79, 013104 (2008), published online Jan. 11, 2008, pp. 013104-1-013104-8.

(Continued)

*Primary Examiner* — Isam A Alsomiri
*Assistant Examiner* — Sanjida Naser
(74) *Attorney, Agent, or Firm* — LOWENSTEIN SANDLER LLP

(57) ABSTRACT

The subject matter of this specification can be implemented in, among other things, a system that includes a light source to produce a first beam, a diffraction optical element (DOE) to generate, based on the first beam configured to have a first phase information, one or more second beams. The system further includes a DOE control module to configure the DOE, for each of a plurality of times, into a respective one of a plurality of DOE configurations, and cause each of the one or more second beams to have a phase information that is different from a phase information of the first beam, wherein the phase information of each of the one or more second beams is determined by a time sequence of the plurality of DOE configurations.

20 Claims, 8 Drawing Sheets

(56) References Cited

U.S. PATENT DOCUMENTS

| | | |
|---|---|---|
| 2002/0071109 A1 | 6/2002 | Allen et al. |
| 2005/0213075 A1 | 9/2005 | Cooke |
| 2010/0073222 A1 | 3/2010 | Mitomo et al. |
| 2010/0128744 A1 | 5/2010 | Deladurantaye et al. |
| 2013/0027240 A1 | 1/2013 | Chowdhury |
| 2013/0044309 A1* | 2/2013 | Dakin .................... G01S 17/89 356/4.09 |
| 2014/0063484 A1* | 3/2014 | Tauro ...................... G01P 3/68 356/28.5 |
| 2016/0299228 A1 | 10/2016 | Maleki et al. |
| 2018/0180739 A1 | 6/2018 | Droz |
| 2018/0217234 A1* | 8/2018 | Skowronek ............ G01S 17/36 |
| 2018/0267151 A1* | 9/2018 | Hall ...................... G01S 7/4816 |
| 2019/0018140 A1 | 1/2019 | Sarkissian et al. |
| 2019/0086518 A1 | 3/2019 | Hallstig et al. |
| 2019/0195665 A1 | 6/2019 | Soga et al. |
| 2019/0257641 A1 | 8/2019 | Tsuchida |
| 2019/0265334 A1 | 8/2019 | Zhang et al. |
| 2019/0339389 A1 | 11/2019 | Russo et al. |
| 2020/0090355 A1* | 3/2020 | Hall ....................... G01S 17/32 |
| 2020/0217961 A1 | 7/2020 | Russo et al. |
| 2021/0149041 A1* | 5/2021 | Cho ....................... G06T 3/4046 |
| 2021/0318435 A1 | 10/2021 | Schmalenberg et al. |
| 2021/0382370 A1* | 12/2021 | Di Teodoro ........ G01S 7/4818 |
| 2021/0396887 A1 | 12/2021 | Schmalenberg |

OTHER PUBLICATIONS

International Search Report and Written Opinion dated Mar. 30, 2022, on application No. PCT/US2021/061481, 10 pages.

International Search Report and Written Opinion dated Feb. 7, 2022, on application No. PCT/US2021/055093, 14 pages.

Aeye iDAR "iDAR is Smarther than LiDAR", aeye.ai/idar/, retrieved Oct. 20, 2020, 11 pages.

Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.

GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.

Lekavich, John, "Basics fo Acousto-Optic Devices", Lasers & Applications Apr. 1986, pp. 59-64.

* cited by examiner

DYNAMIC SENSING CHANNEL MULTIPLEXING FOR LIDAR APPLICATIONS

TECHNICAL FIELD

The instant specification generally relates to range and velocity sensing in applications that involve determining locations and velocities of moving objects. More specifically, the instant specification relates to increasing a number of sensing channels of a light detection and ranging (lidar) device using multiplexing enabled by dynamic diffraction elements.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (e.g., radio, optical, infrared) sensors and charting a driving path through the environment based on the sensed data. Additionally, the driving path can be determined based on positioning (e.g., Global Positioning System (GPS)) and road map data. While the positioning and the road map data can provide information about static aspects of the environment (buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
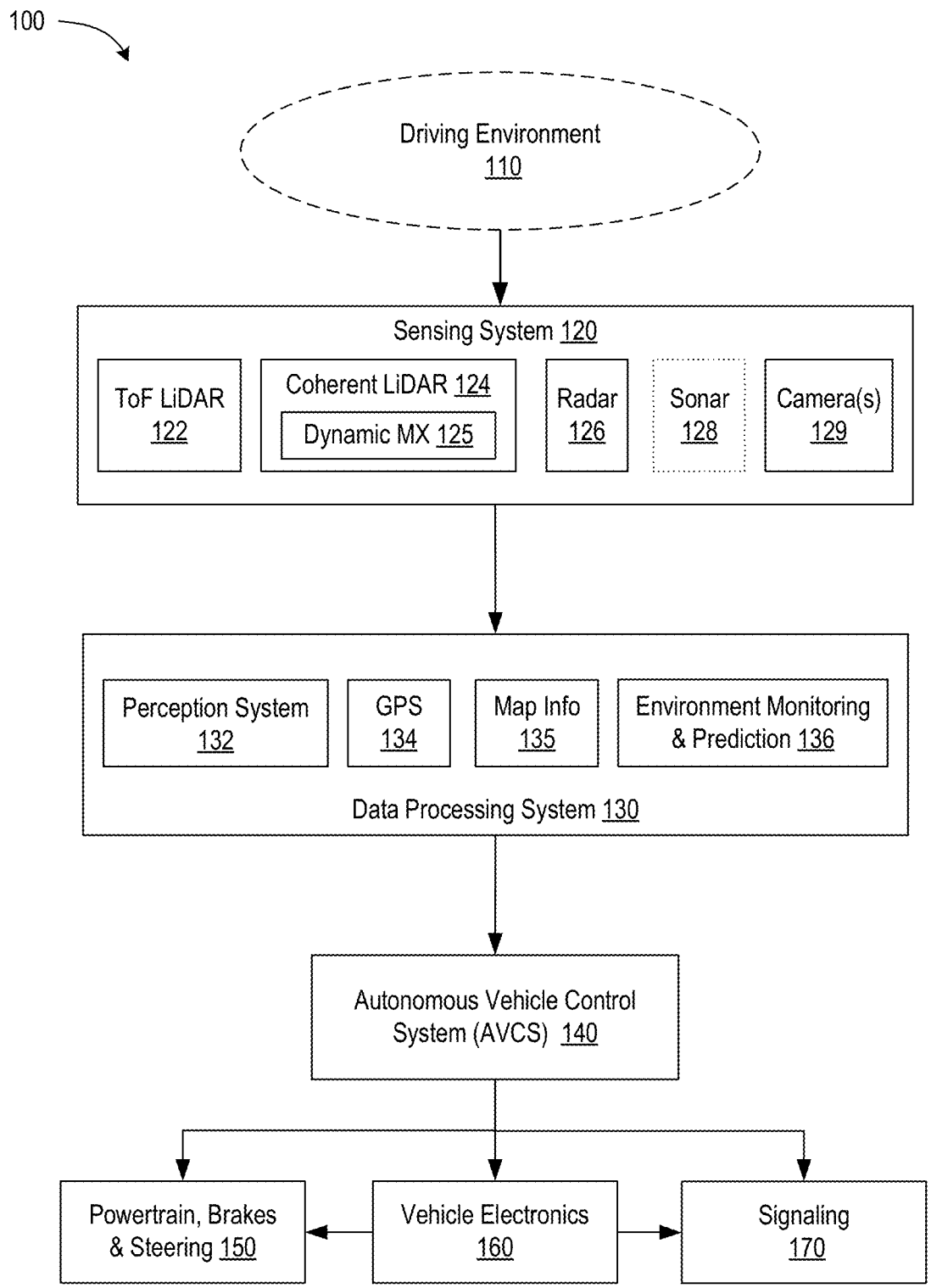
FIG. 1 is a diagram illustrating components of an example autonomous vehicle that uses coherent lidar(s) with dynamic channel multiplexing, in accordance with some implementations of the present disclosure.

In one implementation, disclosed is a system that includes a light source to produce a first beam, a diffraction optical element (DOE) to generate, based on the first beam configured to have a first phase information, one or more second beams, and a DOE control module. The DOE control module is to configure the DOE, for each of a plurality of times, into a respective one of a plurality of DOE configurations, and cause each of the one or more second beams to have a phase information that is different from a phase information of the first beam, wherein the phase information of each of the one or more second beams is determined by a time sequence of the plurality of DOE configurations.

In another implementation, disclosed is an optical sensing system that includes a light source to produce a first beam, a modulator to impart a first phase information to the first beam, and a dynamic beam multiplexing module. The dynamic beam multiplexing module is to generate, using the first beam, a plurality of second beams, each of the second beams having phase information that is different from the first phase information, and output the generated plurality of second beams to an outside environment. The optical sensing system further includes one or more photodetectors to detect a difference between a phase information of a beam reflected from an object in the outside environment and the first phase information, wherein the beam reflected from the object is reflected in response to one of the output second beams interacting with the object. The optical sensing system further includes one or more processing devices to determine, based on the detected difference, a velocity of the object.

In another implementation, disclosed is a method that includes producing, by a light source, a first beam, configuring the first beam to have a first phase information, generating, using a diffraction optical element (DOE) and the first beam, one or more second beams, configuring the DOE, for each of a plurality of times, into a respective one of a plurality of DOE configurations, and causing each of the one or more second beams to have phase information that is different from a phase information of the first beam, wherein the phase information of each of the one or more second beams is determined by a time sequence of the plurality of DOE configurations.

DETAILED DESCRIPTION

An autonomous vehicle can employ a light detection and ranging (lidar) technology to detect distances to various objects in the environment and, sometimes, the velocities of such objects. A lidar emits one or more laser signals (pulses) that travel to an object and then detects arrived signals reflected from the object. By determining a time delay between the signal emission and the arrival of the retro-reflected waves, a time-of-flight (ToF) lidar can determine the distance to the object. A typical lidar emits signals in multiple directions to obtain a wide view of the outside environment. For example, a lidar device can cover an entire 360-degree view by scanning to collect in a series of consecutive frames identified with timestamps. As a result, each sector in space is sensed in time increments $\Delta T$, which are determined by the angular velocity of the lidar's scanning speed. "Frame" or "sensing frame," as used herein, can refer to an entire 360-degree view of the environment obtained over a scan of the lidar or, alternatively, to any smaller sector, e.g., a 1-degree, 5-degree, a 10-degree, or any other angle obtained over a fraction of the scan cycle (revolution), or over a scan designed to cover a limited angle.

ToF lidars can also be used to determine velocities of objects in the environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$, as the ToF technology does not allow to ascertain whether the object maintained the same velocity $\vec{v}$ during this time or experienced an acceleration or deceleration (with detection of acceleration/deceleration requiring additional locations $\vec{r}(t_3)$, $\vec{r}(t_4)$ . . . of the object).

Coherent lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the environment. A signal emitted by a coherent lidar can be modulated (in frequency and/or phase) with a radio frequency (RF) signal prior to being transmitted to a target. A local copy of the transmitted signal can be maintained on the lidar and mixed with a signal reflected from the target; a beating pattern between the two signals can be extracted and Fourier-analyzed to determine the Doppler shift and identify the radial velocity of the target.

Increasing frequency and efficiency of lidar scanning can be beneficial in applications of lidar technology such as autonomous vehicles. Simultaneously producing multiple beams (sensing channels) can reduce the time needed to obtain a full sensing frame. To prevent interference ("crosstalk") between different channels, a lidar device might employ optical modulators that impart different phase or frequency signatures to different output beams. Outfitting lidars with multiple modulators (such as acousto-optic or electro-optic modulators), however, increases complexity, size, and costs of producing and maintaining the lidar devices.

Aspects and implementations of the present disclosure enable methods and systems that achieve channel multiplexing using a single optical modulator. Implementations of the present disclosure describe beam multiplexing elements—such as dynamic diffraction elements—that can cause an incident beam (with a phase or frequency modulation encoded by a single optical modulator) to split into multiple beams and acquire distinct phase signatures, efficiently preventing channel cross-talk. Such phase shuffling can be achieved using a diffraction optical element (DOE) whose configuration is dynamically modified (e.g., shifted in space, has a refractive index changed), e.g., mechanically, optically, or electronically, to cause different diffraction maxima to acquire maxima-specific phase shifts. Efficient shuffling of phase encodings is facilitated by a wrapped nature of phase space with a period of $2\pi$. For example, a phase boost that is consists of seven $2\pi/4$ boosts amounts to a single boost of $3\pi/2$ (since $7\times2\pi/4=1\times2\pi+3\pi/2$).

FIG. 1 is a diagram illustrating components of an example autonomous vehicle (AV) 100 that uses coherent lidar(s) with dynamic channel multiplexing, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, overpasses, underpasses, tunnels, construction zones, parking features, other vehicles, pedestrians, cyclists, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit 126 can be configured to sense both the spatial locations of the objects (including their spatial dimensions) and their velocities (e.g., using the radar Doppler shift technology). The sensing system 120 can include a ToF lidar sensor 122 (e.g., a lidar rangefinder), which can be a laser-based unit capable of determining distances to the objects in the driving environment 110. The ToF lidar sensor 122 can utilize wavelengths of electromagnetic waves that are shorter than the wavelength of the radio waves and can, therefore, provide a higher spatial resolution and sensitivity compared with the radar unit 126.

The sensing system 120 can include a coherent lidar sensor 124, such as a frequency-modulated continuous-wave (FMCW) sensor, phase-modulated lidar sensor, amplitude-modulated lidar sensor, and the like. Coherent lidar sensor 124 can use optical heterodyne detection for velocity determination. In some implementations, the functionality of the ToF lidar sensor 122 and coherent lidar sensor 124 can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple coherent lidar sensor 124 units can be mounted on AV, e.g., at different locations separated in space, to provide additional information about a transverse component of the velocity of the reflecting object.

ToF lidar sensor 122 and/or coherent lidar sensor 124 can include one or more laser sources producing and emitting signals and one or more detectors of the signals reflected back from the objects. ToF lidar sensor 122 and/or coherent lidar sensor 124 can include spectral filters to filter out spurious electromagnetic waves having wavelengths (frequencies) that are different from the wavelengths (frequencies) of the emitted signals. In some implementations, ToF lidar sensor 122 and/or coherent lidar sensor 124 can include directional filters (e.g., apertures, diffraction gratings, and so on) to filter out electromagnetic waves that can arrive at the detectors along directions different from the retro-reflection directions for the emitted signals. ToF lidar sensor 122 and/or coherent lidar sensor 124 can use various other optical components (lenses, mirrors, gratings, optical films, interferometers, spectrometers, local oscillators, and the like) to enhance sensing capabilities of the sensors.

In some implementations, ToF lidar sensor 122 and/or coherent lidar sensor 124 can be 360-degree scanning unit(s) in a horizontal direction. In some implementations, ToF lidar sensor 122 and/or coherent lidar sensor 124 can be capable of spatial scanning along both the horizontal and vertical directions. In some implementations, the field of view can be up to 90 degrees in the vertical direction (e.g., with that at least a part of the region above the horizon can be scanned by the lidar signals or with at least part of the region below the horizon scanned by the lidar signals). In some implementations, e.g., involving aeronautical applications, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths, where applicable.

Coherent lidar sensor 124 can include a dynamic multiplexing (MX) module 125 capable of generating multiple sensing channels, each channel having a distinct phase information (encoding) for probing a particular direction of the driving environment 110. Dynamic MX module 125 can deploy a DOE whose geometry/properties/location can be dynamically controlled as described in more detail below. Each of the sensing channels can be used by coherent lidar sensor 124 for transmitting a phase-modulated (or frequency-modulated) signal and receiving a signal reflected from a target (e.g., an object in the driving environment 110) to determine radial velocity of the target and/or distance to the target, using optical heterodyne and radio frequency circuitry of coherent lidar 124.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and/or incoherent ToF data) to determine distances to various objects in the environment 110 and velocities (radial and transverse) of such objects. In some implementations, perception system 132 can use the lidar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., by ToF lidar sensor 122, coherent lidar sensor 124, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which may include a GPS transceiver (not shown), configured to obtain information about the position of the AV relative to Earth and its surroundings. The positioning data processing module 134 can use the positioning data, e.g., GPS and IMU data) in conjunction with the sensing data to help accurately determine location of the AV with respect to fixed objects of the driving environment 110, such as roadways, lane boundaries, intersections, sidewalks, crosswalks, road signs, curbs, surrounding buildings, and so on, locations of which can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the animated objects (relative to Earth). In some implementations, environment monitoring and prediction component 136 can keep track of the changing appearance of the environment due to motion of the AV relative to the environment. In some implementations, environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GPS data processing module 134, and environment monitoring and prediction component 136 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), or any other self-propelled vehicles capable of being operated in a self-driving mode (without a human input or with a reduced human input). "Objects" can include any entity, item, device, body, or article (animated or unanimated) located outside the autonomous, such as roadways, buildings, trees, bushes, sidewalks, bridges, mountains, other vehicles, piers, banks, landing strips, animals, birds, or other things.

Figure 2:
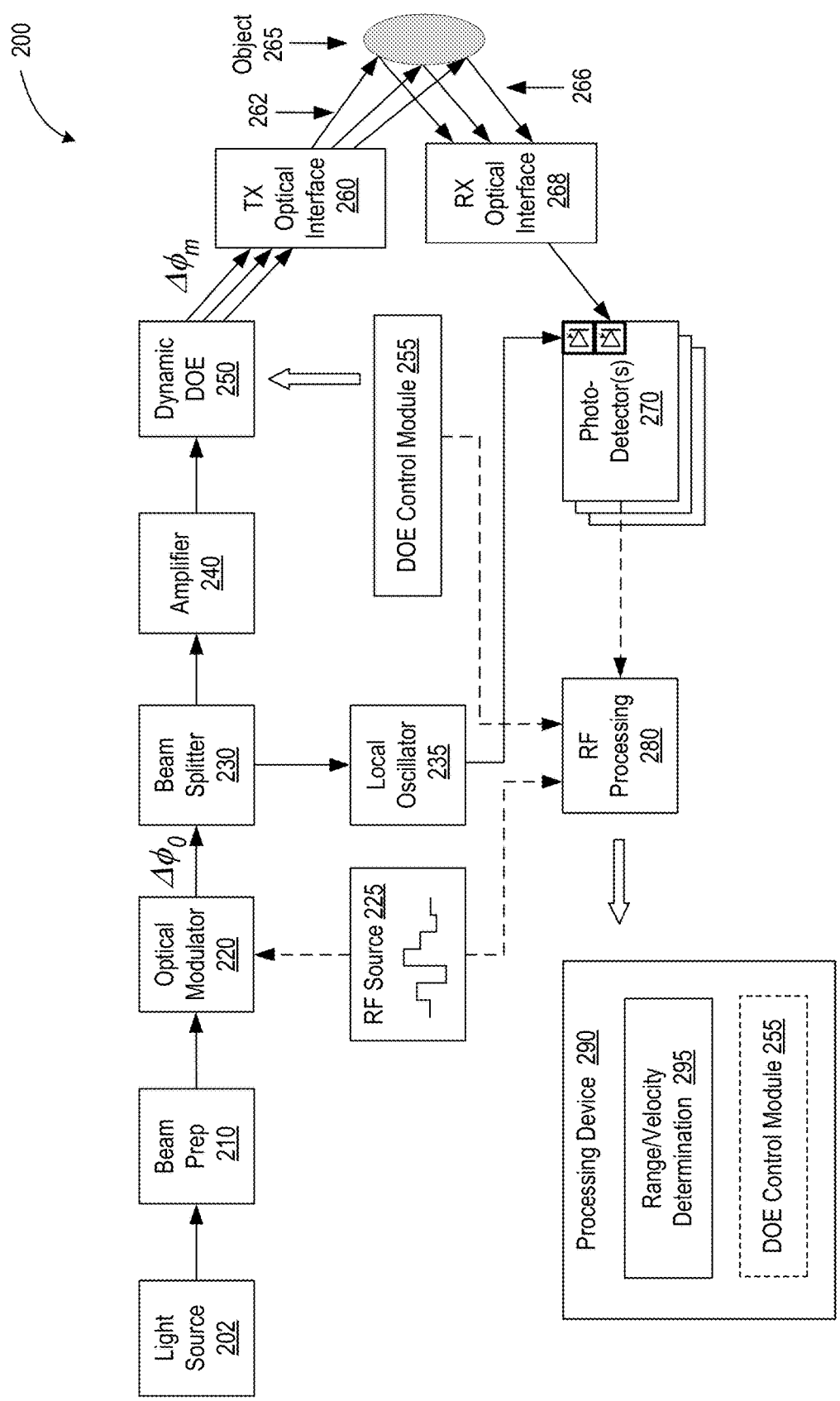
FIG. 2 is a block diagram illustrating an example implementation of an optical sensing system that uses dynamic diffraction multiplexing for increasing sensing channel count for range and velocity detection, in accordance with some aspects of the present disclosure.

FIG. 2 is a block diagram illustrating an example implementation of an optical sensing system 200 (e.g., a part of sensing system 120) that uses dynamic diffraction multiplexing for increasing sensing channel count for range and velocity detection, in accordance with some aspects of the present disclosure. Depicted in FIG. 2 is a light source 202 configured to produce one or more beams of light. "Beams" should be understood herein to refer to any signals of electromagnetic radiation, such as beams, wave packets, pulses, sequences of pulses, or other types of signals. The light source 202 can be a broadband laser, a narrow-band laser, a light-emitting diode, a Gunn diode, and the like. The light source 202 can be a semiconductor laser, a gas laser, an ND:YAG laser, or any other type of a laser. The light source 202 can be a continuous wave laser, a single-pulse laser, a repetitively pulsed laser, a mode locked laser, and the like.

In some implementations, light output by the light source 202 can be conditioned (pre-processed) by one or more components or elements of a beam preparation 210 stage of the optical sensing system 200 to ensure narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, crystal resonators, etc.), polarizers, feedback loops, lenses, mirrors, diffraction optical elements, and other optical devices. For example, if the light source 202 is a broadband light source, the output light can be filtered to produce a narrowband beam. In some implementations, where the light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on.

The light output by beam preparation 210 can be input into an optical modulator 220 stage to provide modulation to the light output by beam preparation 210. "Optical modulation" is to be understood herein as referring to any form of angle modulation, such as phase modulation (e.g., any time sequence of phase changes added to the phase of the beam), frequency modulation (e.g., any sequence of frequency up-chirps and/or down-chirps), or any other type of modulation (including a combination of phase and frequency modulation) that affects the phase of the wave. Optical modulation is also to be understood herein as including, where applicable, amplitude modulation. Amplitude modulation can be applied to the light in combination with angle modulation or separately, without angle modulation. In some implementations, optical modulator 220 can use an acousto-optic modulator, an electro-optic modulator, a Lithium Niobate modulator, a heat-driven modulator, a Mach-Zender modulator, and the like, or any combination thereof. In some implementations, optical modulator 220 can add a phase shift that is a continuous function of time $\Delta\phi_0(t)$, where the subscript "0" indicates that the phase shift is applied to the initial beam (to distinguish from phase shifts $\Delta\phi_m$ that can be added during channel multiplexing, as described below). In some implementations, added phase shifts can be discrete and can take on a number of values, e.g., N discrete values across the phase interval $2\pi$. In some implementations, the phase interval $2\pi$ can be separated into N phase bins (intervals of width $2\pi/N$) with the optic modulator adding phase shifts $\Delta\phi_0$ within one of the bins (e.g., near a center of the respective bin). A time sequence of phase shifts (phase encoding) can be added by an RF source 225 (or any other source) outputting a signal (e.g., an RF electric signal) to the optical modulator 220, as depicted schematically by a dashed arrow in FIG. 2. In some implementations, signals communicated between RF source 225 and optical modulator 220 can cause the optical modulator 220 to impart consecutive phase boosts $2\pi/N$, $2\times2\pi/N$, $3\times2\pi/N$ . . . to the light beam. In some implementations, signals communicated between RF source 225 and optical modulator 220 can cause the optical modulator 220 to impart frequency chirps to the light beam, e.g., a sequence of up-chirps interspersed with down-chirps. In some exemplary implementations, phase or frequency RF encoding can have duration between a microsecond and tens of microseconds and can be repeated with a repetition rate ranging from a kilohertz to hundreds of kilohertz.

After optical modulation, light output by optical modulator 220 can undergo spatial separation at a beam splitter 230 to produce a local oscillator 235 copy of the modulated beam. The local oscillator 235 can be used as a reference signal to which a signal reflected from a target can be compared. The beam splitter 230 can be a prism-based beam splitter, a partially-reflecting mirror, a polarizing beam splitter, a beam sampler, a fiber optical coupler (optical fiber adaptor), or any similar beam splitting element (or a combination of two or more beam-splitting elements). The light beam can be delivered to the beam splitter 230 (as well as between any other components depicted in FIG. 2) over air or over light carriers such as optical fibers or other types of waveguide devices.

The signal copy of the light beam (a copy to be transmitted into the driving environment) can be amplified by amplifier 240 before being delivered to a dynamic diffraction optical element (dynamic DOE) 250 for channel multiplexing. Dynamic DOE 250 can be a diffraction grating, a hologram, a spatial light modulator, a deformable mirror, or any other optical element capable of producing multiple beams from an incident beam while maintaining coherence of the produced beams. The produced beams can correspond to maxima (e.g., bright fringes) caused by constructive interference of light waves (wavelets) scattered by various parts of the dynamic DOE 250. In one implementation, grooves (rulings, valleys, peaks, etc.) of the dynamic DOE 250 can be displaced in a controlled way to cause the diffracted maxima to acquire phase shifts $\Delta\phi_m$ that depend on the diffraction order m. As a result, a sequence of phase shifts $\{\Delta\phi_0(t_j)\}$ imparted to the initial beam at a set of times (timestamps) $\{t_j\}$, the initial beam incident onto the dynamic DOE 250 can be transformed into multiple beams each having modified sets of phase shifts $\{\Delta\phi_0(t_j)+\Delta\phi_m(t_j)\}$ that are different for each of the diffraction orders m. Because phase space is wrapped modulo $2\pi$, the sequences of phase shifts of various diffraction maxima can represent distinct phase encodings even when the phase shifts $\Delta\phi_m$ are deterministic functions of the diffraction order m. Phase-modified in this way, different diffraction maxima m can be used as separate sensing channels without suffering from cross-talk. In some implementations, configurations of the dynamic DOE 250 can be controlled by a DOE control module 255, which can be a combination of digital and analog components. In some implementations, DOE control module 255 can impart dynamical (e.g., time-dependent) modifications to geometry of the DOE. For example, dynamic DOE 250 (or rulings of the dynamic DOE) can be shifted in a lateral direction to cause various diffraction maxima m to acquire m-specific diffraction shifts $\Delta\phi_m(t_j)$ at various timestamps $t_j$. In one implementation, as described below in relation to FIGS. 3 A-B, the shift of the m=0 maximum (main maximum) can be zero so that the main maximum can have the phase encoding $\Delta\phi_0$ imparted by the optic modulator 220. The first maximum m=1 sensing channel can incur a non-zero phase shift $\Delta\phi_1\neq0$ whereas the higher maxima m≥2 sensing channel can incur phase shifts $\Delta\phi_m=m\Delta\phi_1$ that are multiples of the phase shift of the m=1 sensing channel. In another implementation, as described below in relation to FIG. 4, even the main maximum m=0 can have a non-zero phase shift, whereas phase shifts of the maxima m≥1 depend on the order m in a non-linear fashion.

In some implementations, modification of geometry of the dynamic DOE 250 can be caused by a mechanical actuator, such as a piezoelectric crystal, a material displaying electrostriction or magnetostriction, or any material capable of changing shape or geometry in response to electric field, electric current, magnetic field, and so on. The mechanical actuator can be in contact with the dynamic DOE 250 and can cause the dynamic DOE 250 to shift in space in response to a signal from DOE control module 255. In some implementations, the dynamic DOE 250 can be (fully or at least partially) a non-mechanical device. For example, the dynamic DOE 250 can include an element of a transparent material whose refractive index can be controlled by a signal from DOE control module 255. As a result of the modification of optical paths of various diffraction maxima, the sensing channels acquire different phase shifts $\Delta\phi_m$.

In some implementations, DOE control module 255 can be a part of processing device 290 responsible for the ultimate determination of range (distance) and velocity. In other implementations, DOE control module 255 can be executed on a separate device (e.g., as a dedicated microcontroller) which can be communicatively coupled to processing device 290 to provide information about phase shifts $\Delta\phi_m(t_j)$ of various sensing channels to processing device 290 for Doppler-shift velocity identification.

The sensing channels can be output, through a transmission (TX) optical interface 260 towards one or more objects 265, which can be objects in the driving environment 110. Optical interface 260 can be an aperture or a combination of optical elements, e.g., lenses, mirrors, collimators, polarizers, waveguides, and the like. The optical elements of the optical interface 260 can be used to direct the beams produced by the dynamic DOE 250 to a desired region in the outside environment. In some implementations, the beams 262 output into the environment can be used to generate adjacent points in the point cloud of a sensing frame. In some implementations, the output beams 262 can be spread out more widely, to reduce cross-talk between various output beams. As a way of example, twenty beams (channels) can be output within a cone with an angle of 25° for a first instance of beam transmission. At second instance of beam transmission, a new set of twenty beams can be output within the cone of the same size but with a small angular shift (e.g., in either a horizontal or vertical direction, or both) so that the two cones partially (or even significantly) overlap with each other. Such a process can be repeated for subsequent instances of beam transmission until a full sensing frame (e.g., a 360-degree view in the horizontal direction and a 90-degree view in the vertical direction) is obtained.

Output beams 262 can travel to one or more objects 265 and, upon interaction with the respective objects, generate reflected beams 266 which can enter the optical sensing system 200 via a receiving (RX) optical interface 268. In some implementations, RX optical interface 268 can share at least some optical elements with the TX optical interface 260, e.g., aperture, lenses, mirrors, collimators, polarizers, waveguides, and so on. In such implementations, a combined TX/RX optical interface 260/268 can be equipped with one or more beam splitters, optical circulators, or other devices capable of separating reflected beams and directing the separated beams to one or more coherent light analyzers, such as one or more balanced photodetectors 270, in one implementation. In some implementations, multiple balanced photodetectors 270 can be used to detect phase information of the reflected beams 266. In other implementations, a single balanced photodetector can be used to detect phase information of the reflected beams mixed into a single beam (e.g., by a beam mixer of the RX optical interface 268). In some instances, only some of the output beams 262 can generate reflected beams 266 whereas other output beams 262 can be absorbed, scattered, or simply miss any of the objects in the environment.

Balanced photodetector(s) 270 can also receive the local oscillator 235 copy of the signal beam. A balanced photodetector can detect phase differences between two input beams. As depicted, balanced photodetector(s) 270 can detect a difference between phases of the reflected beams, e.g., between the phase of the local oscillator 235 and a mixed beam that includes all reflected beams 266. Balanced photodetector(s) 270 can output electric signals representative of the information about relative phases of each pair of received beams and provide output electric signals to a RF processing module 280 for amplification and digitization, e.g., using one or more amplifiers and analog-to-digital converters. RF processing module 290 can include spectral analyzers, such as Fast Fourier Transform (FTT) analyzers, in some implementations. RF processing can also include various filters, local RF oscillators, mixers, and other devices to facilitate identification of phase difference between phase encoding of the output beams 262 and reflected beams 266.

In some implementations, RF processing 280 (e.g., using the FTT analyzer) can identify presence of multiple sets of phase shifts $\{\Delta\phi^R(t_j)\}$ of the reflected beam which can be time-delayed compared with phase shifts $\{\Delta\phi_m^T(t_j)\}$ of the transmitted beams for each of the sensing channels m. Because in some implementations only the initial beam (having phase shift $\Delta\phi(t)$) is stored as the local oscillator 235, the actual phase shifts $\{\Delta\phi_m^T(t_j)\}$ of each of the transmitted beams can be obtained using information—e.g., received from DOE control module 255—about additional phase shifts imparted to the initial beam by dynamic DOE

250. Based on the known phase shifts $\{\Delta \phi_m^T(t_j)\}$ of the transmitted beams, RF processing can first identify, for each group of phase shifts $\{\Delta \phi^R(t_j)\}$ in the reflected beam, what sensing channel m had phase shifts $\{\Delta \phi_m^T(t_j)\}$ most closely correlated with the respective group. For example, a group of phase shifts $\{\Delta \phi^R(t_j)\}$ in some vicinity of time r can be most strongly correlated with consecutive time shifts $\{\pi/4, \pi/2, -\pi/2, \pi/4, -\pi, \pi/4\}$ of a transmitted beam corresponding to channel m=5. The RF processing 280 can then determine, based the amount of time delay τ between transmitted phase shifts $\{\Delta \phi_m^T(t_j)\}$ of the identified sensing channel m (m=5 in this example) and the received group of phase shifts $\{\Delta \phi^R(t_j)\}$.

Having identified the time delay τ, using the coarse correlation procedure as described above, RF processing can then analyze the finer phase differences between the phase shifts of the received group (related back to the amount of time r) and the output phase shifts in the identified channel m by constructing $\{\Delta \phi^R(t_j-\tau)-\Delta \phi_m^T(t_j)\}$. This finer structure of phase shifts can be provided to processing device 290 (e.g., in the form of a digital signal). Based on the finer phase differences $\{\Delta \phi^R(t_j-\tau)-\Delta \phi_m^T(t_j)\}$ between known phases of output beams 262 and detected phases of reflected beams 266, range and velocity determination module 295 of the processing device 290 can determine Doppler shift and respective radial components of the velocity of objects that caused reflection of each of reflected beams 266. Additionally, range and velocity determination module 295 can use time delay r can be used to identify the distance to the object, D=cτ/2, where c is the speed of light.

Figure 3A:
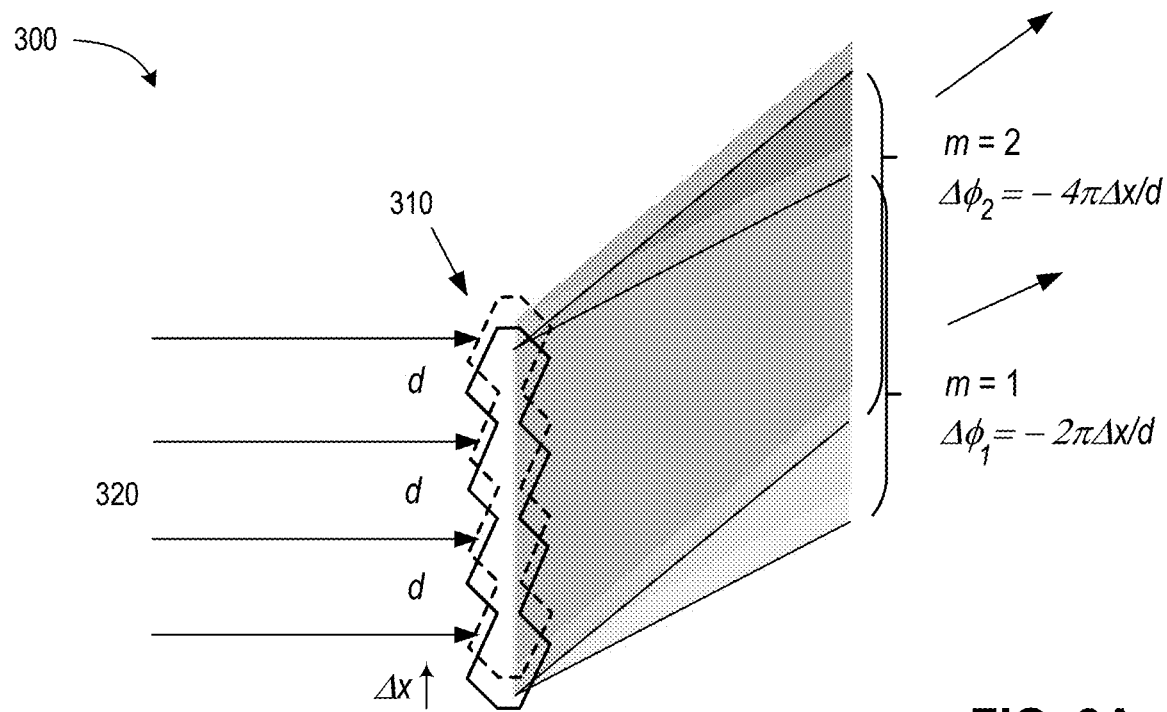
FIG. 3A illustrates an example implementation of sensing channel multiplexing using a dynamic diffraction optical element, in accordance with some aspects of the present disclosure.

FIG. 3A illustrates an example implementation 300 of sensing channel multiplexing using a dynamic diffraction optical element, in accordance with some aspects of the present disclosure. Shown is a dynamic DOE, such as a DOE 310, having a grating period d and scattering an incident light beam 320 (of wavelength λ) into a series of diffraction maxima m (for conciseness, shown are only maxima m=1 and m=2). DOE 310 can be displaced in a lateral direction to distance $\Delta$ x, which can be controlled by DOE control module 255 and can be different for different times $t_j$ (timestamps). In some implementations, DOE 310 can be an electromagnetically induced—e.g., by crossing laser beams—diffraction grating with the displacement $\Delta$ x controlled by changing a geometry of the laser beams The displacement $\Delta$ x causes diffracted beams to acquire phase shifts that are m-dependent. For example, the first diffraction maximum can have a phase shift $\Delta \phi_1=-2\pi\Delta x/d$, whereas the second diffraction maximum can have a larger phase shift $\Delta \phi_2=-4\pi\Delta x/d$. The displacement $\Delta$ x can be induced by an actuator coupled to DOE 310, such as a capacitive actuator, inductive actuator, a piezoelectric element, a material (or a combination of materials) displaying electrostriction (or magnetostriction), and the like.

Figure 3B:
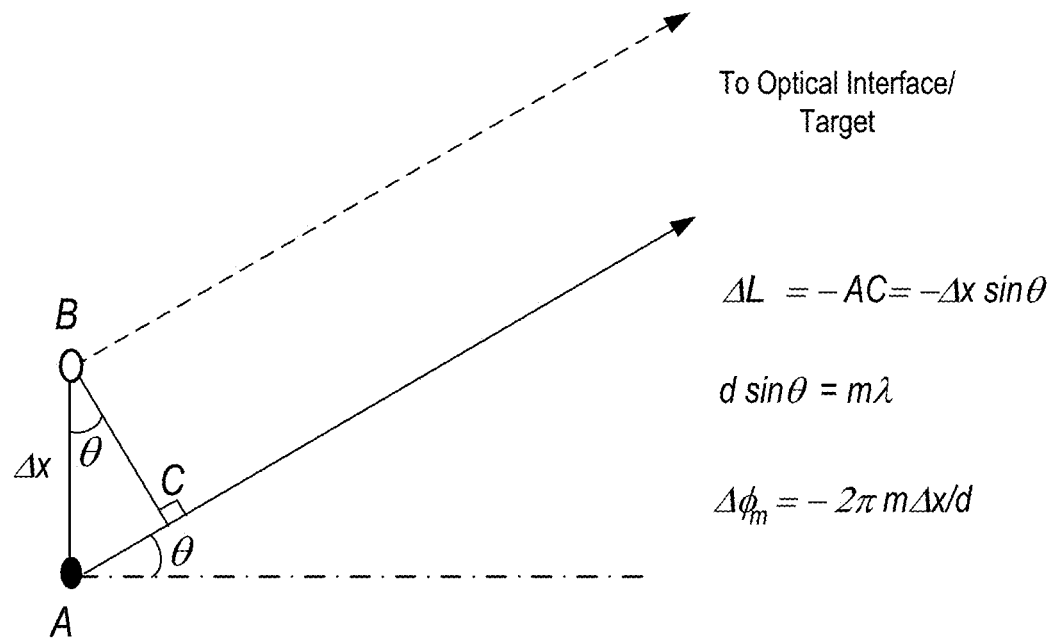
FIG. 3B illustrates an origin of phase shift experienced by diffracted beams in the channel multiplexing setup depicted in FIG. 3A.

FIG. 3B illustrates an origin of phase shift experienced by diffracted beams in the channel multiplexing setup depicted in FIG. 3A. Shown is a beam scattered from point A of the DOE 310 at an angle θ to the direction of incident beam 320. The shift Δx causes a new optical path (depicted with the dashed arrow) to have a length that is different from the length of the unshifted optical path (depicted with the solid arrow) by the amount $\Delta L=-AC=-\Delta x \sin\theta$. Because the angle of scattering θ is determined by the law of diffraction, d sin θ=mλ, the shifted beam acquires a phase increment that is m-specific: $\Delta \phi_m = 2\pi\Delta L/\lambda = -2\pi m \Delta x/d$. Such diffraction maxima-dependent phase shifts can be used to shuffle phase encodings of various sensing channels (each corresponding to a respective diffraction maxima), as described below in relation to FIG. 5.

Figure 4A:
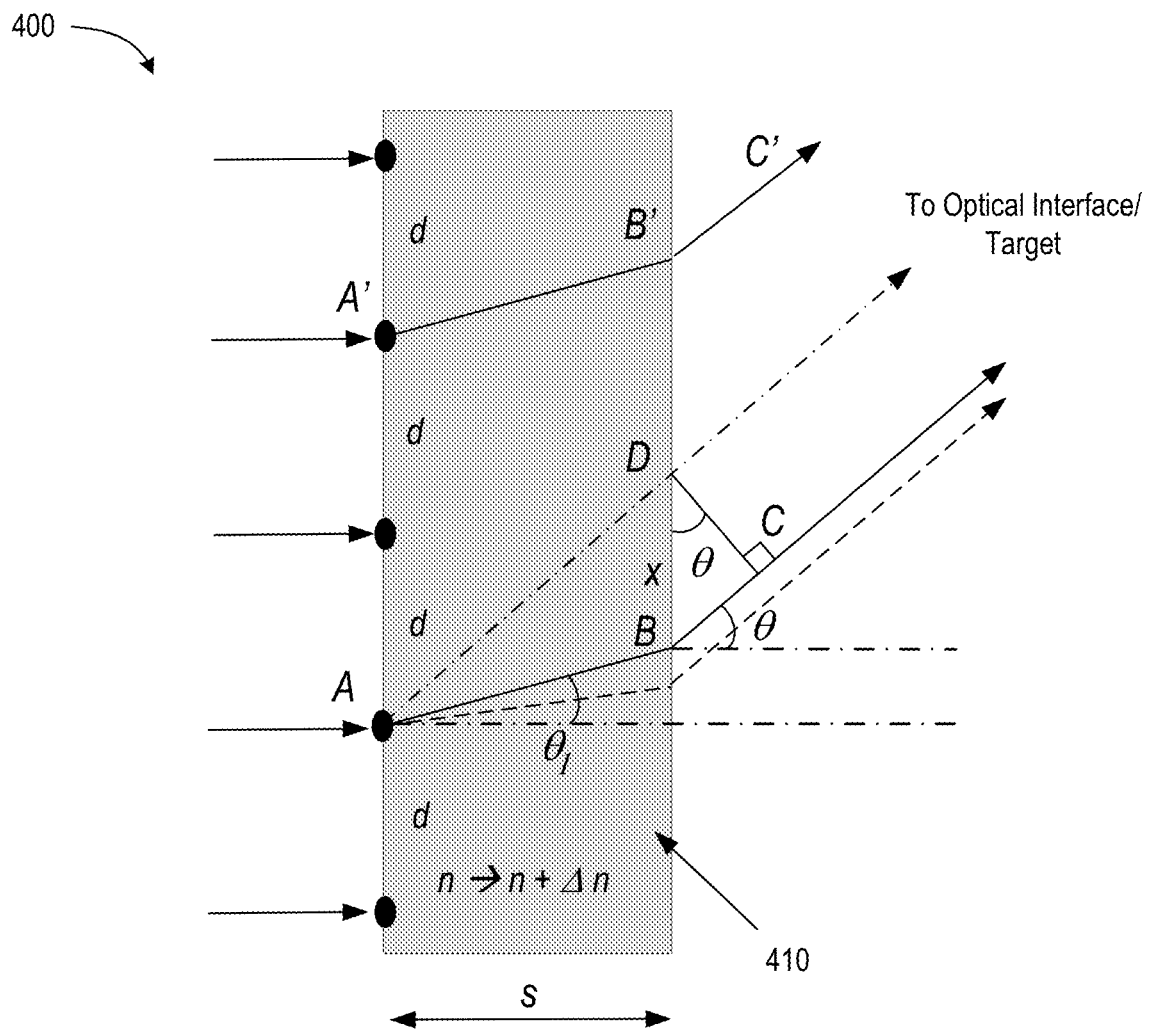
FIG. 4A illustrates another example implementation of sensing channel multiplexing using a dynamic diffraction optical element, in accordance with some aspects of the present disclosure.

FIG. 4A illustrates another example implementation 400 of sensing channel multiplexing using a dynamic diffraction optical element, in accordance with some aspects of the present disclosure. Shown is a dynamic DOE, such as a DOE that includes a slab 410 of a material with a refractive index n that can be controlled by DOE control module 255 and can be different for different times (timestamps). A refractive index change $\Delta$ n can be induced by applying an electric signal (e.g., electric field or voltage) to slab 410, in one implementation. A diffracted beam (for conciseness, a single diffraction maximum is depicted) can propagate, in free space, at an angle θ to the direction of the incident beam, and at an angle $\theta_1$ within slab 410. Because the distances traveled within slab 410 by beams belonging to the same maximum are the same (e.g., AB=A'B'), the diffraction condition remains the same as in the absence of the slab: d sin θ=mλ. The presence of the slab, however, can modify the phases of the diffracted beams compared with the beams diffracted in the absence of the slab. Namely, in the absence of the slab, the phase would be determined by distance AD=s/cos θ and would be equal to 2πs/θ. In the presence of slab 410, the phase is determined by distance AB of the beam travel inside the slab (where the beam collects phase $2\pi ns/\theta_1$) and the distance BC=x sin θ=s(tan θ−tan $\theta_1$)sin θ (where the beam collects phase $2\pi s(\tan\theta-\tan\theta_1)\sin\theta/\lambda$). Accordingly, the total phase difference caused by the presence of slab 410 is $\phi=2\pi s(n\cos\theta_1-\cos\theta)/\lambda$.

When the signal from DOE control module 255 is applied to slab 410, the signal causes the refractive index to change from n to n+$\Delta$ n, the phase change is imparted to the beam:

$$\Delta\phi = \frac{2\pi s}{\lambda}\Delta(n\cos\theta_1) = \frac{2\pi s\Delta n}{\lambda\cos\theta_1}$$

This phase shift is m-dependent and can be recast in a form that makes such dependence explicit:

$$\Delta\phi_m = \frac{2\pi s\Delta n}{\lambda\sqrt{1-\frac{m^2\lambda^2}{n^2d^2}}}.$$

Unlike the linear m-dependence of the phase shifts in case of the shifted DOE of FIG. 3, refractive-index modulated DOE of FIG. 4 has a non-linear m-dependence. Non-linear phase shifts can be used in channel multiplexing for efficient shuffling of phase encodings in a way that is similar to how linear phase shifts can be used, which is described in more detail below.

Figure 4B:
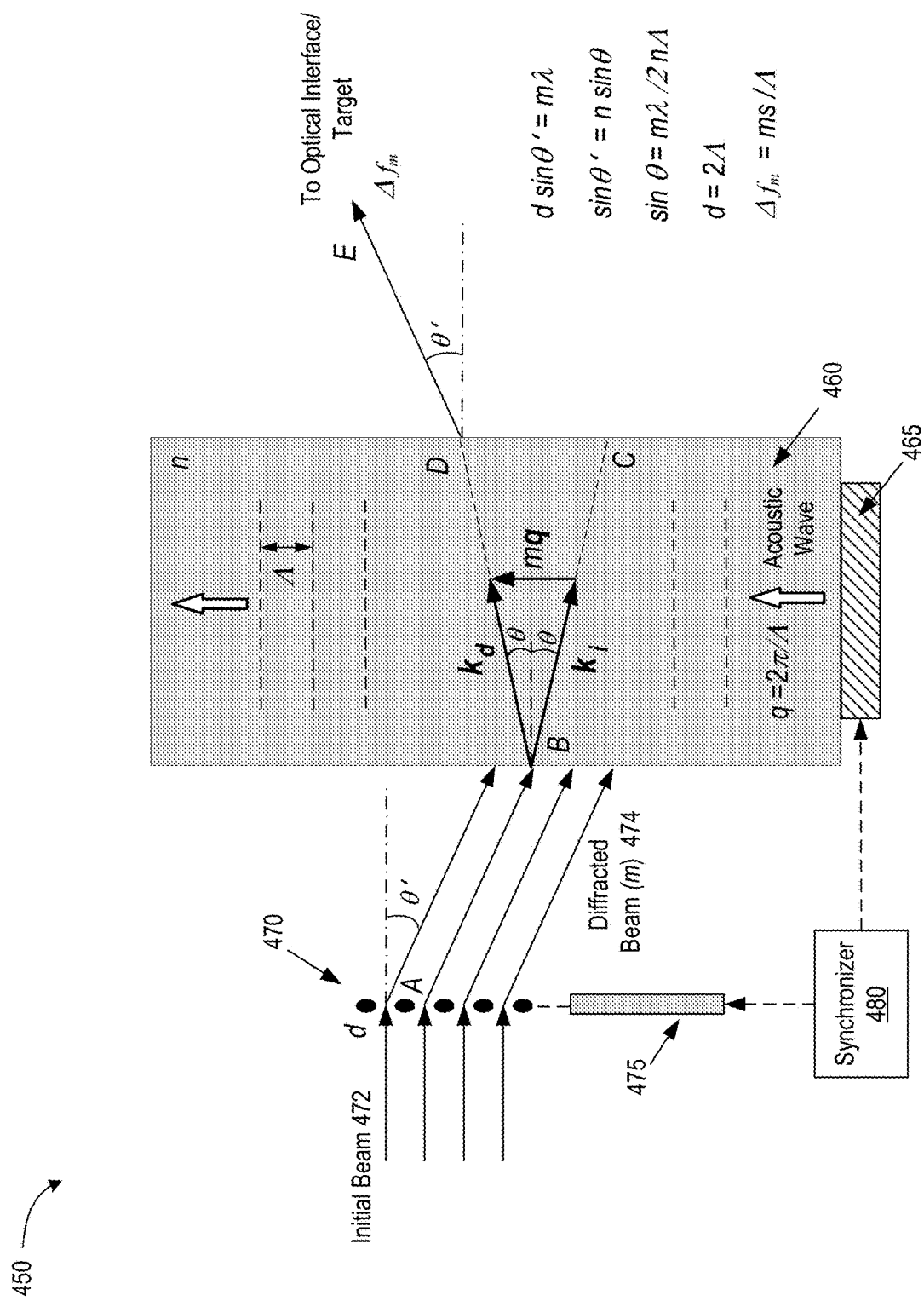
FIG. 4B illustrates another example implementation of sensing channel multiplexing using a dynamic diffraction optical element that implements frequency shifting, in accordance with some aspects of the present disclosure.

FIG. 4B illustrates another example implementation 450 of sensing channel multiplexing using a dynamic diffraction optical element that implements frequency shifting, in accordance with some aspects of the present disclosure. Shown is a dynamic DOE that can include an acousto-optic modulator (AOM) 460 (which can be different from optical modulator 220) coupled to a transducer 465 (e.g., a piezoelectric transducer) capable of inducing acoustic waves of controlled amplitude, phase, and wavelength Λ inside AOM 460. The induced acoustic wave can be a standing wave (implemented by the other end of AOM 460 having an open boundary) or a propagating wave (implemented by the other end of AOM 460 having a second transducer (not depicted) to induce matching oscillations of the AOM material and prevent formation of a reflected acoustic wave. A light beam propagating at an angle θ within AOM 460 can experience Bragg reflection from modulations of the acoustic deformation of the AOM 460 material. Bragg reflection can occur with wave vector (momentum) conservation, $\vec{k}_d = \vec{k}_i + m\vec{q}$, causing the diffracted wave vector $\vec{k}_d$ to differ from the incident wave vector $\vec{k}_i$ by an integer number m of the acoustic wave vectors (q=2π/Λ). Bragg scattering can be viewed as absorption (positive m>0) of m phonons (quanta of acoustic field) by the photon of the incident light or as absorption (negative m<0) of m phonons by the photon of the incident light. Bragg scattering (with phonon emission/absorption) can be an inelastic process occurring with the change of the angular frequency (energy) of the photon:

$$\Delta\omega = \frac{ck_d}{n} - \frac{ck_i}{n} = \frac{c|\vec{k}_i + \vec{q}|}{n} - \frac{ck_i}{n} = msq,$$

with s being the speed of acoustic waves and n being the refractive index of the AOM 460 material. When the wave vector of the acoustic wave is small compared with the wave vector of light, Bragg scattering is quasi-elastic, $k_d \approx k_i$, and the direction of incidence BC (and diffraction BD) for the m-th diffraction maximum is $$\sin\sin\theta = \frac{mq}{2k_i} = \frac{m\lambda}{2n\Lambda},$$

where λ is the wavelength of the incident light in vacuum ($k_i = 2\pi n/\lambda$).

To concurrently output, using the common AOM 460, multiple diffraction channels m (each channel having the appropriate angle of incidence θ dictated by the Bragg condition), an additional dynamic diffraction element 470 can be used. In one non-limiting implementation, an initial light beam can undergo diffraction at diffraction element 470 and can split into multiple diffracted beams 474 (one diffraction direction is shown for conciseness) propagating at an angle sin sin θ'=mλ/d, where d is the spacing of the diffraction grating. Upon entering the material of AOM 460, the diffracted beams change their direction of propagation per Snell's law, sin sin θ=sin sin θ'/n=mλ/nd. Accordingly, all diffraction maxima m can satisfy Bragg condition at the same time provided that the spacing d of the diffraction grating of element 470 is twice the wavelength of sound $$d = 2\Lambda.$$

To impart a desired phase information to the diffracted beams, a transducer 465 can be used. Transducer 465 can induce an acoustic wave having a wavelength Λ(t) and frequency $f_a(t) = s/\Lambda(t)$, which are varied with time. For example, acoustic frequency f(t) can have a sequence of chirp-up and chirp-down periods when f(t) increases and decreases (e.g., linearly, or in any other way) with time, e.g., $f(t) = f_0 \pm \beta t$. To ensure a matching adjustment in the directions of beams 474 incident on AOM 460, an actuator 475 can be used to impart corresponding changes to the diffraction spacing, $d(t) = 2s/(f_0 \pm \beta t)$, to enable Bragg scattering in various diffraction channels simultaneously. In some implementations, synchronization between actuator 475 and transducer 465 can be performed by a synchronizer 480, which can be a part of DOE control module 255.

As a result, the m-th diffraction maximum (depicted as ray DE in FIG. 4B) output toward the optical interface/target can have a frequency shift $\Delta f_m(t) = \Delta \omega/2\pi = mf_a(t)$ that is different (and unique) for each diffraction maximum m. In some implementations, frequency shifts $\Delta f_m(t)$ imparted by the system illustrated in FIG. 4B can be imparted in addition to phase shifts imparted to the initial beam by optical modulator 220 illustrated in FIG. 2. As a result, each of the output multiplexed sensing channels, e.g., the main beam (m=0), the beams generated by phonon absorption (m>0), and the beams generated by phonon emission (m<0) can have phase information that is unique to the respective output channel. Accordingly, reflected beams 266 can be received by photodetectors 270 and processed by RF processing 280 substantially as described above (in relation to phase-shifted signals). In some implementations, transducer 465 (in addition to imparting frequency chirps) can impart additional phase shifts to the output multiplexed channels by modifying a phase of the acoustic wave. In some implementations, additional optical elements (e.g., diffraction gratings, adjustable mirrors, electro-optic modulators with adjustable refractive index, etc.) can be used to compensate for slight variations in the direction of propagations (caused by $\Delta f_m(t)$) of sensing signals DE output to the target.

Although FIGS. 3-4 illustrate some exemplary dynamic DOEs, numerous other implementations of diffractive elements are possible that cause diffraction maxima beams (separate sensing channels) to acquire controlled phase shifts or frequency shifts. Such controlled changes to phase information (phase shifts or frequency shifts) can then be used to create distinct phase encodings for various sensing channels.

Figure 5A:
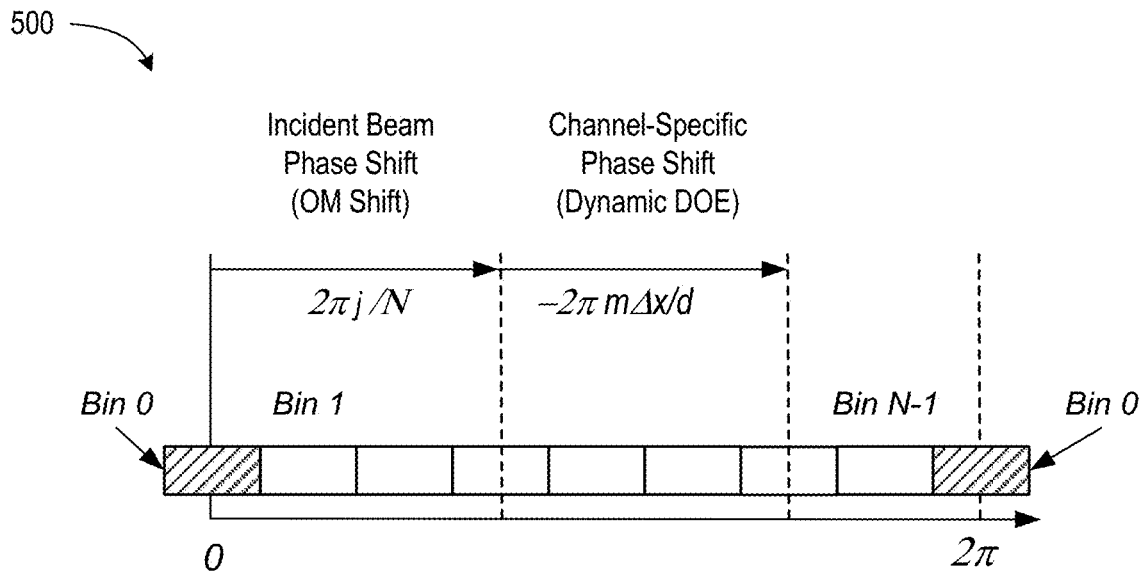
FIG. 5A illustrates an example implementation of phase modulation that can be used for sensing channel multiplexing, in accordance with some aspects of the present disclosure.

FIG. 5A illustrates an example implementation 500 of phase modulation that can be used for sensing channel multiplexing, in accordance with some aspects of the present disclosure. Shown is a phase space interval [0, 2π] representing phase values that are substantially different (two phases that differ by a multiple of 2π correspond to the same state of the wave's electromagnetic field). DOE control module 255 can be configured to represent the interval [0, 2π] via N phase bins (or, simply, "bins") of size 2π/N. Although exact boundaries of the bins can be located in any way, shown is an arrangement where l-th bin (0≤l≤N−1) is centered at 2πl/N. As depicted schematically in FIG. 5A, a phase shift $\Delta \phi = 2\pi l/N$ is applied (e.g., by optical modulator 220) to the initial beam produced by light source 202 and configured by beam preparation 210. The bin number 1 can be different for various time stamps and a sequence of bin numbers $\{l(t_i)\}$ at various timestamps i can represent the phase encoding of the initial beam. In some implementations, the phase encoded at a particular timestamp can be close to the center of the bin selected for the respective timestamp. In some implementations, the phase encoded can be somewhere within the respective bin, but not necessarily near its center, and a phase anywhere within l-th bin can be considered to refer to some reference point within the bin (e.g., the center of the bin).

An additional phase shift can be imparted to each of the diffracted beams produced by dynamic DOE 250 (e.g., DOE of FIG. 3, DOE of FIG. 4, or any other possible DOE having a similar functionality). For concreteness, a case of linear (with the order m of the diffraction maximum) phase shifts is described, but similar considerations can be used to characterize any non-linear phase shifts (e.g., as identified in reference to DOE of FIG. 4). In one exemplary implementation, dynamic DOE 250 can be configured to cause a shift in increments of $2\pi/M$, where M can be an integer number. Such phase shifts, for example, can be realized in a dynamic DOE in which the grating is shifted in increments $\Delta x$ that are multiples of d/M. When shift $\Delta x=sd/M$ (with integer s) is implemented by dynamic DOE module 255, the k-th sensing channel (k-th order diffraction beam) acquires the total phase shift $$\Delta\phi_{jk} = \frac{2\pi j}{N} + \frac{2\pi sk}{M}.$$

The phase shift $\Delta \phi_{jk}$ falls within bin $b_{jk}$ that is determined by dividing $\Delta \phi_{jk}$ by the bin size $2\pi/N$ modulo N:

$$b_{jk}(s) = Int\left[j + \frac{skN}{M} + \frac{1}{2}\right] \mod(N),$$

where Int[ ] indicates taking the integer part and the extra ½ accounts for the fact that bin boundaries are located at half-integer values.

Figure 5B:
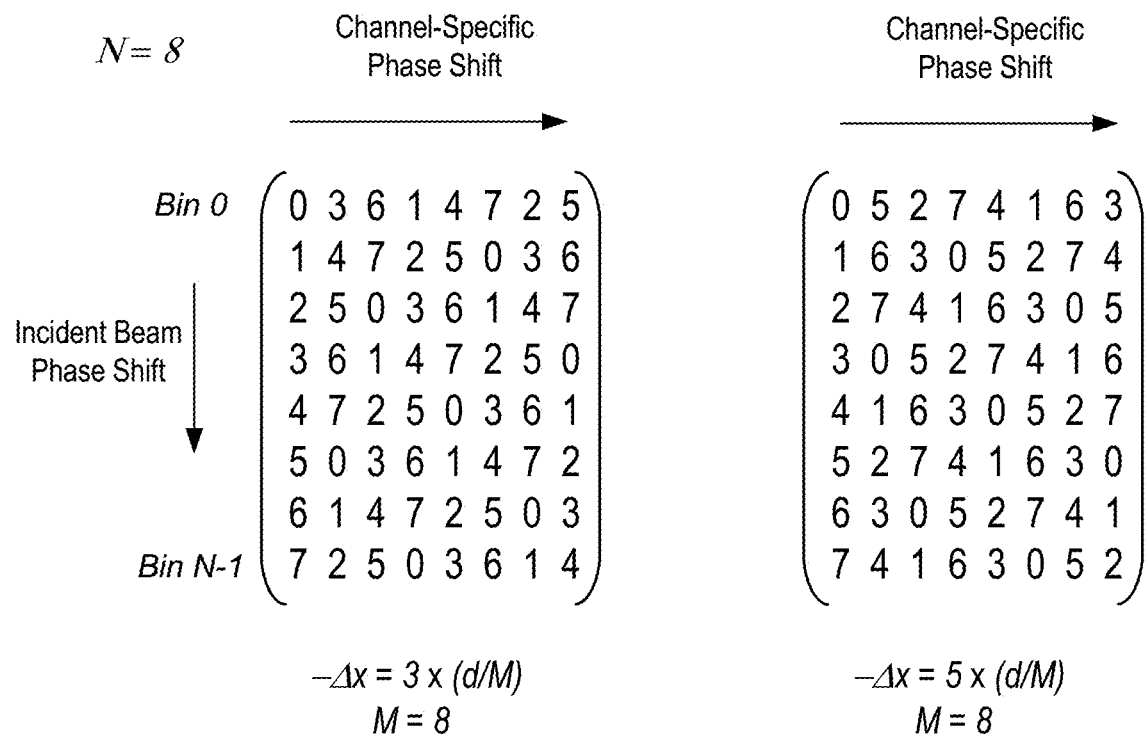
FIG. 5B illustrates an example representation of phase shifts that can be used for sensing channel multiplexing, in accordance with some aspects of the present disclosure.

The (bin-assigned) phase shifts $b_{jk}(s)$ can be represented via an N×M matrix with the row index $0 \le j \le N-1$ and the column index $0 \le k \le M-1$. (Larger k reproduce the same values of phase shifts, since $b_{j,k+M}=b_{jk}$). FIG. 5B illustrates an example representation of phase shifts that can be used for sensing channel multiplexing, in accordance with some aspects of the present disclosure. FIG. 5B illustrates phase shifts for an example case of N=M=8 for two illustrative values of the (discretized) displacement s=M$\Delta$x/d: s=−3 and s=−5. A first column of each matrix illustrates phase shifts of the initial beam (which can also be the same as phase shifts of the main diffraction maximum m=0) and subsequent columns represent shifts of the additional diffraction maxima. Encoding by optical modulator 220 can include selecting, for each timestamp, one of the values from the first column, and selecting by dynamic DOE module 255 a DOE shift value (e.g., value s). The corresponding channel-specific phase shifts can then be determined from consecutive elements of the respective row. As illustrated by FIG. 5B, in each of the sensing signals, the phase shifts can be reshuffled to such an extent that substantially different phase encodings are output with different sensing beams.

For example, if sensing channel m=0 has encoding sequence 163052, and DOE displacement s=−3 is selected, th channel m=1 is to have sequence 416305, channel m=2 is to have sequence 741630, channel m=3 is to have sequence 274163, channel m=4 is to have sequence 527416, channel m=5 is to have sequence 052741, and so on. The described example is intended to illustrate only the basic concept of using dynamic phase shifts. In implementations, the number of bins N can be much larger than 8, the size of the displacement increment the size of the displacement increment d/M can be much smaller, so that the number of channels M can also be much larger than 8, resulting in a much larger number of various possible phase encodings.

Figure 6:
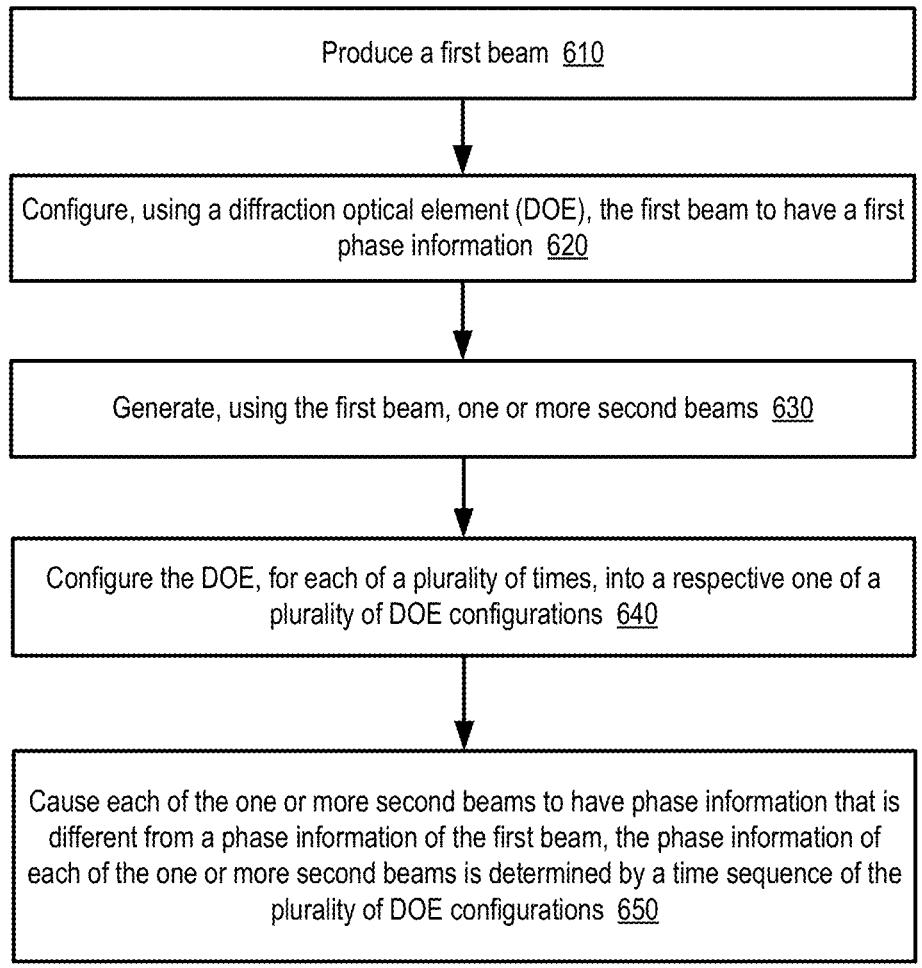
FIG. 6 depicts a flow diagram of an example method of producing and configuring sensing beams in a dynamic channel multiplexing setup for range and velocity detection, in accordance with some implementations of the present disclosure.

FIG. 6 depicts a flow diagram of an example method 600 of producing and configuring sensing beams in a dynamic channel multiplexing setup for range and velocity detection, in accordance with some implementations of the present disclosure. Method 600, as well as method 700 described below in relation to FIG. 7, can be performed using systems and components described in relation to FIGS. 1-5, e.g., by the optical sensing system 120. Various operations of methods 600 and 700 can be performed in a different order compared with the order shown in FIGS. 6-7. Some operations of methods 600 and 700 can be performed concurrently with other operations. Some operations can be optional. Methods 600 and 700 can be used for determination of range and velocity of objects in autonomous driving vehicle environments. Methods 600 and 700 can be used to improve coverage, resolution, and speed of detection of objects and their state of motion, as well as decrease costs, size, and complexity of optical sensing systems.

Method 600 can include producing, at block 610, a first beam by a light source. The first beam can be a coherent beam, e.g., a laser beam. Additionally, the first beam can be prepared (e.g., filtered, collimated, polarized, etc.) to produce a light beam of desired properties. For example, the spectrum of the first beam can be narrowed so that a target linewidth is achieved. At block 620, the first beam can be configured to have a first phase information. For example, an optical modulator, such as an electro-optic or an acousto-optic modulator, or the like, can be used to configure the first beam to have the first phase information. The first phase information can include any form of angle modulation, such as phase modulation or frequency modulation. Phase modulation can include a series of phase boosts (shifts) $\Delta \phi_0(t_1)$, $\Delta \phi_0(t_2)$ . . . of predetermined duration, spacing, repetition rate, and the like. Frequency modulation can include a series of up-chirps (frequency increases), down-chirp (frequency increases), which can be linear or non-linear chirps of predetermined bandwidth, slope, repetition rate, and the like.

At block 630, method 600 can continue with generating, using a diffraction optical element (DOE) and the first beam, one or more second beams. A dynamic beam multiplexing module can be used to generate the second beam(s). The multiplexing module can include the DOE, a DOE control module, optical fibers, lenses, mirrors, diffraction gratings, collimators, field lenses, apertures, and so on. In some implementations, the multiplexing module can include one or more optical interfaces to output the generated beam(s) to the outside environment. Generating the second beam(s) can include directing the first beam to the DOE, The DOE can include a grating, which can be a grating configured to produce diffracted light using reflection, refraction, scattering (or any combination thereof) of the first (incident on the grating) beam. The DOE can include a refractive component whose refractive index can be changed using electromagnetic signals. The DOE can include an optical modulator (e.g., acousto-optic modulator) whose optical properties can be changed by inducing one or more acoustic waves.

At block 640, the dynamic beam multiplexing module can change an optical configuration of one or more optical elements interacting with the first beam. For example, the DOE can be configured, for each of a plurality of times, into a respective one of a plurality of DOE configurations. Different DOE configurations can include different positions of the DOE. For example, rulings (ridges/grooves/etc.) of the DOE can be shifted by a controlled amount using the DOE control module. In some implementations, the DOE control module can send an electric signal to an actuator coupled to the DOE and the actuator can shift the rulings of the DOE by a controlled amount. In some implementations, the actuator can be a crystal (or any non-crystalline material) possessing electrostriction. Each of various DOE configurations can be characterized by a respective amount $\Delta x$ of the shift of the rulings of the DOE. In some implementations, configuring the DOE can include changing a refractive index of a part of the DOE by a controlled amount $\Delta n$ corresponding to the respective one of the plurality of DOE configurations. More specifically, in one implementation, the DOE control module can send an electric signal to a spatial light modulator having one or more components with a refractive index that can be changed by electric field. In some implementations, configuring the DOE into each of the plurality of DOE configurations can include selecting a frequency (wavelength) of a standing or propagating acoustic wave induced in an acousto-optic modulator.

Changing the optical configuration using the dynamic beam multiplexing module can cause (block 650) each of the one or more second beams to have phase information that is different from a phase information of the first beam. In some implementations, the phase information of each of the second beams can be determined by a time sequence of the plurality of DOE configurations. The phase information of each of the one or more second beams can be different from the phase information of all other of the second beams. In some implementations, the phase information of each of the one or more second beams comprises a temporal sequence of phase shifts, each phase shift caused by a respective one of the plurality of DOE configurations. For example, a sequence of shifts of DOE rulings $\Delta x(t_1)$, $\Delta x(t_2)$ ... or a sequence of the changes of the refractive index $\Delta n(t_1)$, $\Delta n(t_2)$ ... can cause maxima-specific phase shifts $\Delta \phi_1(t_1)$, $\Delta \phi_m(t_2)$ ... for various diffraction maxima m. As a result of changing the optical configurations of the DOE, the maxima-specific phase shifts can be added to the phase shifts $\Delta \phi_0(t_1)$, $\Delta \phi_0(t_2)$ ... of the first beam to cause the second beams to have phases $\Delta \phi_0(t_1) + \Delta \phi_m(t_1)$, $\Delta \phi_0(t_2) + \Delta \phi_m(t_2)$, .... The temporal sequence of phases for each maximum m can represent a phase encoding of the corresponding sensing channel. In some implementations, the phase information of each of the one or more second beams comprises a temporal sequence of frequency shifts, each frequency shift caused by a respective one of the plurality of DOE configurations. For example, a sequence of acoustic wavelengths $\Lambda(t_1)$, $\Lambda(t_2)$ ... can cause maxima-specific frequency shifts $\Delta f_m(t_1)$, $\Delta f_m(t_2)$ ... for various diffraction maxima m.

Figure 7:
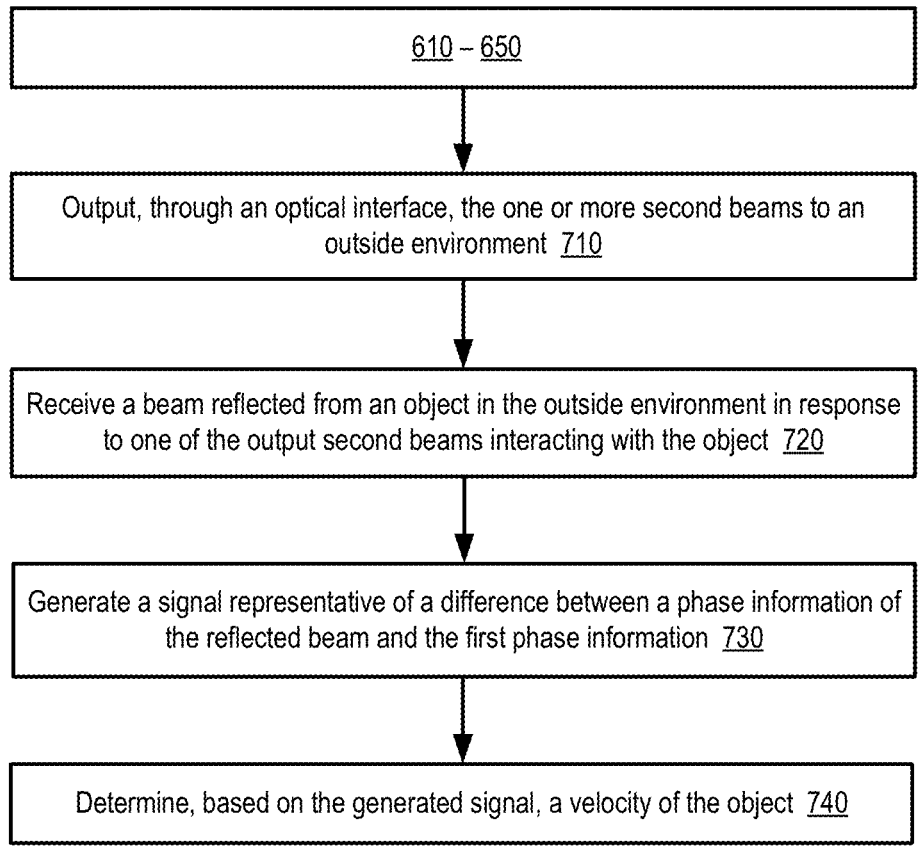
FIG. 7 depicts a flow diagram of an example method of using produced sensing beams in a dynamic channel multiplexing setup for range and velocity detection, in accordance with some implementations of the present disclosure.

FIG. 7 depicts a flow diagram of an example method 700 of using produced sensing beams in a dynamic channel multiplexing setup for range and velocity detection, in accordance with some implementations of the present disclosure. Method 700 can be used in combination with method 600. Method 700 can be performed by components of the optical sensing system than are different from components that perform method 600. In some implementations, some of the components performing method 600 can perform some of the operations of method 600. In some implementations, method 700 can include performing some of all blocks 610-650 of method 600.

Method 700 can include outputting, through an optical interface, the one or more second beams to an outside environment (block 710). Some of the second beams can travel to various objects located in the outside environment. Beams that strike such objects can be reflected back to the sensing system. Some of the beams can miss any of the objects and not be reflected back. At block 720, method 700 can continue with receiving a beam reflected from an object in the outside environment in response to one of the output second beams interacting with the object. In some instances more than one output beam can be reflected from the same object and received by the sensing system. In some instances different reflected beams can be reflected from different objects.

At block 730, method 700 can continue with generating, e.g., using one or more photodetectors, a signal representative of a difference between a phase information of a beam reflected from the object and the first phase information. In some implementations, the phase information of the reflected beam can be determined based on a difference between the reflected beam and a local oscillator copy of the first beam. At block 740, method 700 can continue with determining, e.g., using a processing device and based on the generated signal, a velocity of the object that generated the reflected beam.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a light source to produce a first beam;
   a diffraction optical element (DOE) to generate, based on the first beam configured to have a first phase information, a plurality of second beams, wherein each beam in the plurality of second beams is directed in a different direction from each other, and wherein a phase information of an individual beam in the plurality of second beams is different from the phase information of at least one other beam in the plurality of second beams; and
   a DOE control module to:
      configure the DOE, for each of a plurality of times, into a respective one of a plurality of DOE configurations, and
      cause each of the plurality of second beams to have the phase information that is different from the first phase information, wherein the phase information of each of the plurality of second beams is determined by a time sequence of the plurality of DOE configurations.

2. The system of claim 1, wherein the phase information of each of the plurality of second beams is different from the phase information of all other beams of the plurality of second beams.

3. The system of claim 1, wherein the phase information of each of the plurality of second beams comprises a temporal sequence of phase shifts, each phase shift caused by a corresponding DOE configuration of the plurality of DOE configurations.

4. The system of claim 3, wherein to configure the DOE, the DOE control module is to shift a plurality of rulings of the DOE by a controlled amount associated with the corresponding DOE configuration.

5. The system of claim 3, wherein to configure the DOE, the DOE control module is to change a refractive index of a part of the DOE by a controlled amount associated with the corresponding DOE configuration.

6. The system of claim 1, wherein the phase information of each of the plurality of second beams comprises a temporal sequence of frequency shifts, each frequency shift caused by a corresponding DOE configuration of the plurality of DOE configurations.

7. The system of claim 6, wherein the phase information of each of the plurality of second beams is imparted by an acoustic wave induced in an acousto-optic modulator.

8. The system of claim 1, further comprising:
   an optical modulator to configure the first beam to have the first phase information.

9. The system of claim 8, wherein the optical modulator is one of an acousto-optic modulator or an electro-optic modulator.

10. The system of claim 1, further comprising:
    an optical interface to output the plurality of second beams to an outside environment.

11. The system of claim 10, further comprising one or more photodetectors to:
    generate a signal representative of a difference between a phase information of a beam reflected from an object in the outside environment and the first phase information, wherein the beam reflected from the object is reflected in response to one of the plurality of second beams interacting with the object.

12. The system of claim 11, further comprising a processing device to:
    determine, based on the generated signal, a velocity of the object.

13. An optical sensing system comprising:
    a light source to produce a first beam;
    a modulator to impart a first phase information to the first beam;
    a dynamic beam multiplexing module to:
       generate, using the first beam, a plurality of second beams, wherein a phase information of each of the second beams is different from the first phase information, wherein each of the second beams is directed in a different direction from each other, and wherein the phase information of an individual beam of the plurality of second beams is different from the phase information of at least one other beam of the plurality of second beams; and
       output the generated plurality of second beams to an outside environment; one or more photodetectors to:
    detect a difference between a phase information of a beam reflected from an object in the outside environment and the first phase information, wherein the beam reflected from the object is reflected in response to one of the plurality of second beams interacting with the object; and
    one or more processing devices to determine, based on the detected difference, a velocity of the object.

14. The optical sensing system of claim 13, wherein the phase information of each of the plurality of second beams comprises a temporal sequence of phase shifts, wherein at least two of the phase shifts are different from each other.

15. The optical sensing system of claim 14, wherein the phase shifts are caused by the dynamic beam multiplexing module changing an optical configuration of one or more optical elements interacting with the first beam.

16. A method comprising:
    producing, by a light source, a first beam;
    configuring the first beam to have a first phase information;
    generating, using a diffraction optical element (DOE) and the first beam, a plurality of second beams, wherein each beam in the plurality of second beams is directed in a different direction from each other, and wherein a phase information of an individual beam in the plurality of second beams is different from the phase information of at least one other beam in the plurality of second beams;
    configuring the DOE, for each of a plurality of times, into a respective one of a plurality of DOE configurations; and
    causing each of the plurality of second beams to have phase information that is different from the first phase information, wherein the phase information of each of the plurality of second beams is determined by a time sequence of the plurality of DOE configurations.

17. The method of claim 16, wherein the phase information of each of the plurality of second beams is different from the phase information of all other beams of the plurality of second beams.

18. The method of claim 16, wherein the phase information of each of the plurality of second beams comprises a temporal sequence of phase shifts, each phase shift caused by a corresponding DOE configuration of the plurality of DOE configurations.

19. The method of claim 18, wherein configuring the DOE comprises shifting, using a DOE control module, a plurality of rulings of the DOE by a controlled amount associated with to the corresponding DOE configuration.

20. The method of claim 16, further comprising:
outputting, through an optical interface, the plurality of second beams to an outside environment; and
generating, using one or more photodetectors, a signal representative of a difference between a phase information of a beam reflected from an object in the outside environment and the first phase information, wherein the beam reflected from the object is reflected in response to one of the output second beams interacting with the object.

* * * * *